R. S. TROTT.
VEHICLE SPRING.
APPLICATION FILED MAR. 6, 1913.

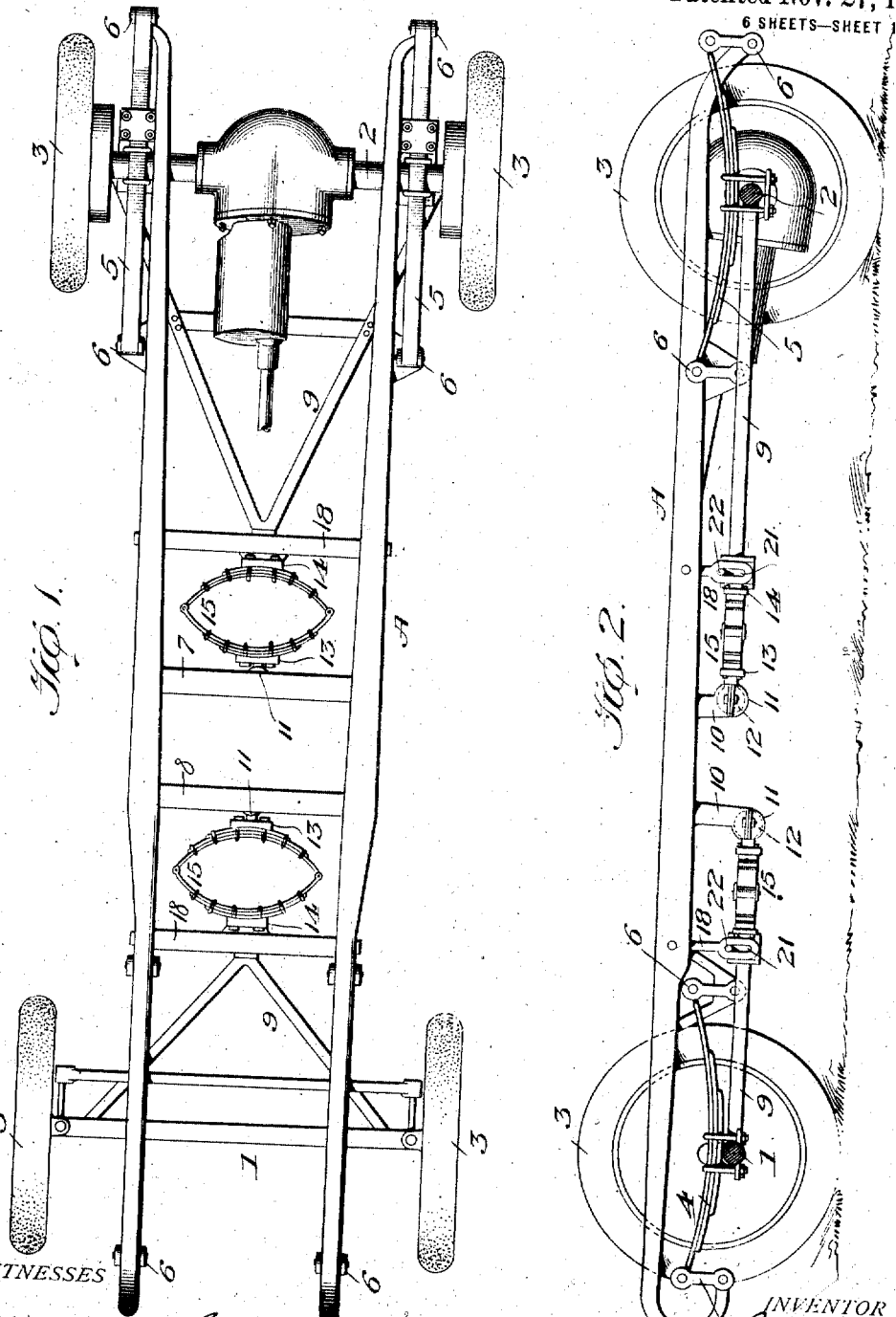

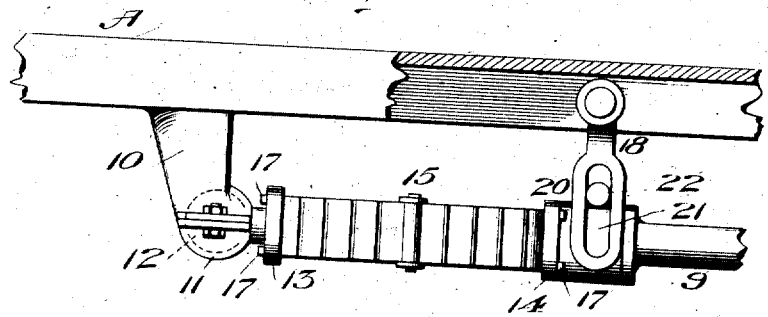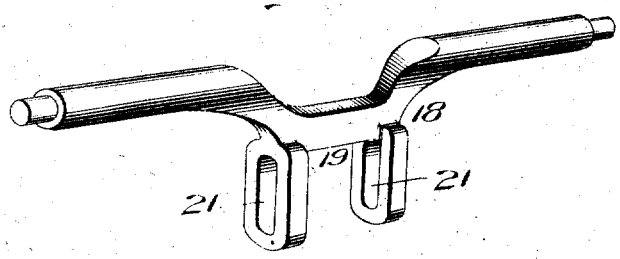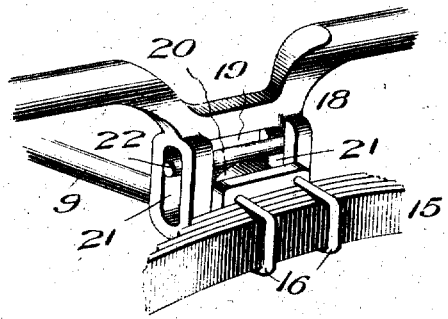

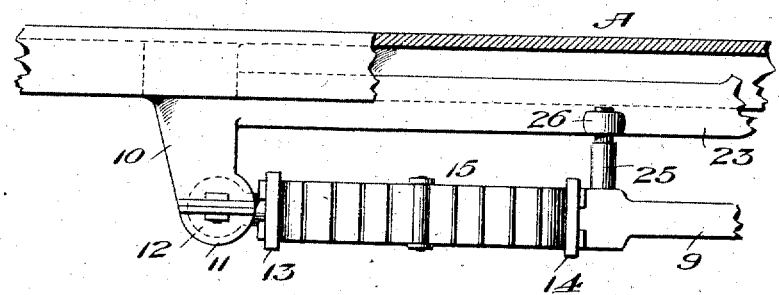
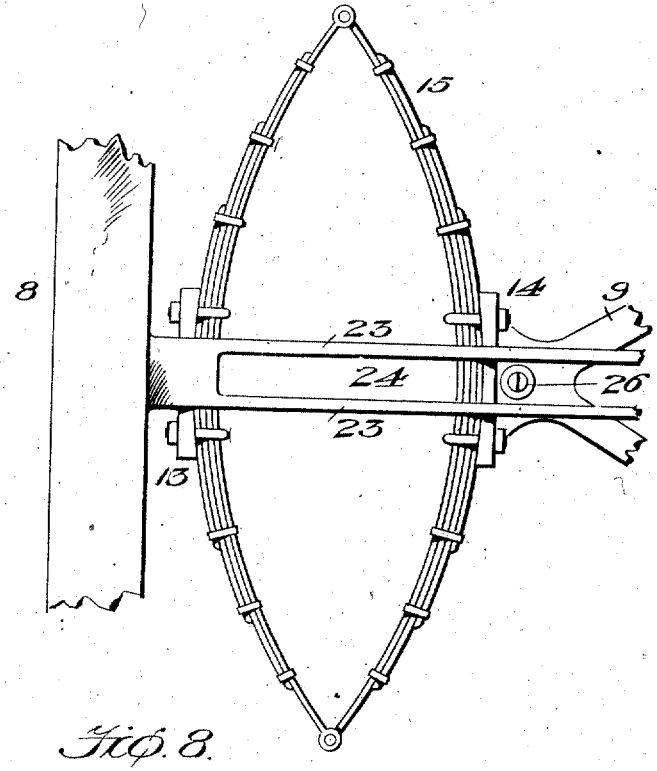
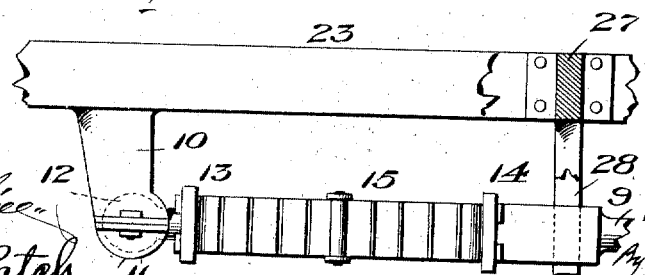

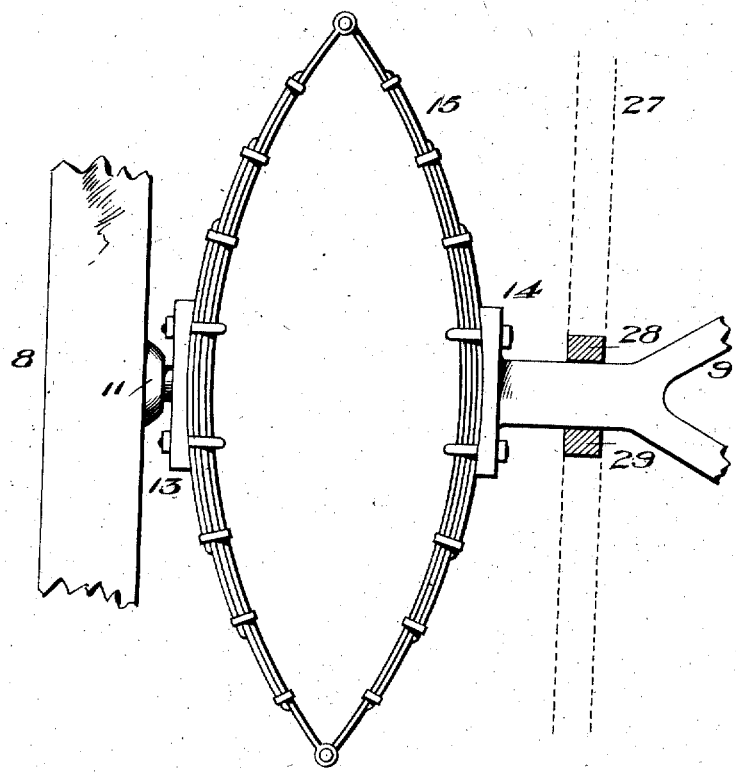
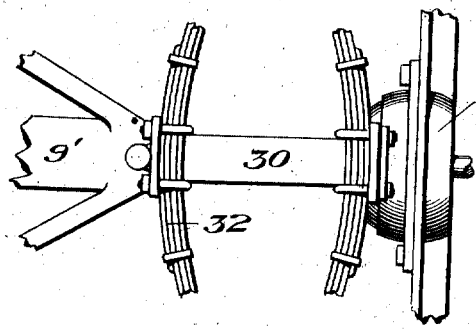
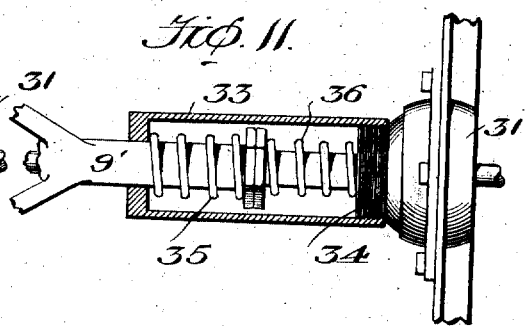

1,247,746.

Patented Nov. 27, 1917.
6 SHEETS—SHEET 5.

WITNESSES

INVENTOR
Rolland S. Trott
By Vernon E. Hodges
His Attorney

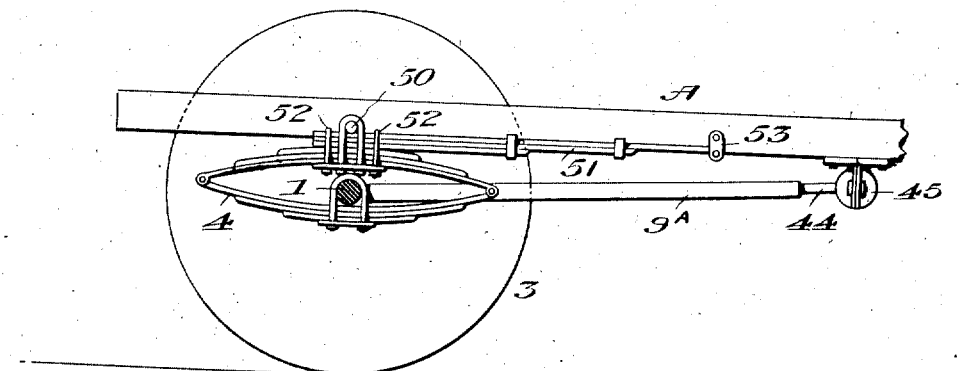
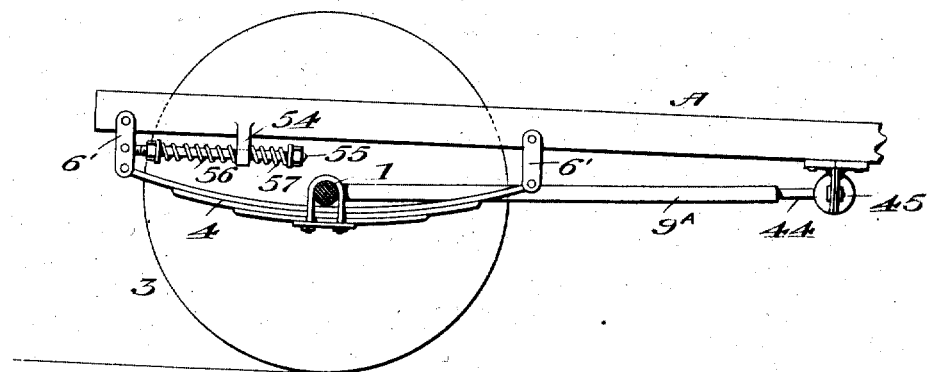
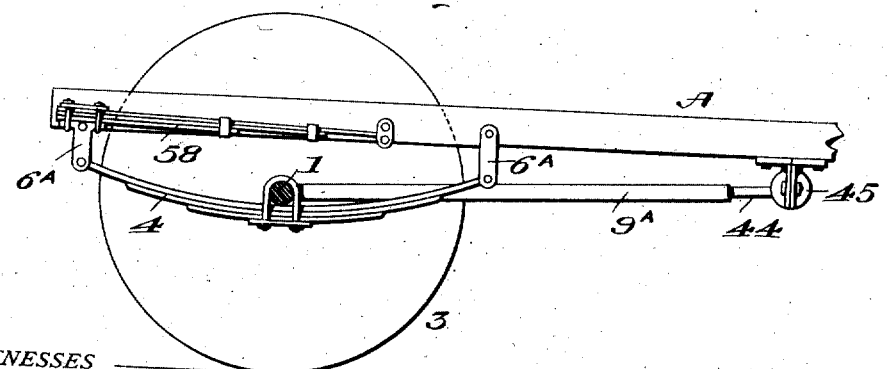

UNITED STATES PATENT OFFICE.

ROLLAND S. TROTT, OF DENVER, COLORADO.

VEHICLE-SPRING.

1,247,746.   Specification of Letters Patent.   Patented Nov. 27, 1917.

Application filed March 6, 1913. Serial No. 752,393.

*To all whom it may concern:*

Be it known that I, ROLLAND S. TROTT, a citizen of the United States, residing at Denver, in the county of Denver, and State of Colorado, have invented certain new and useful Improvements in Vehicle-Springs, of which the following is a specification.

My invention relates to an improvement in vehicle springs and more particularly to that type of spring disclosed in Patents Nos. 1,029,731 and 1,029,732, granted to me June 18, 1912, and on which this is an improvement.

The object of this invention is to provide a spring structure for vehicles that will permit of a free movement of the axles in the direct line of any jolt received, that is either vertically, horizontally or obliquely at any angle between the vertical and horizontal and will restore the axles to their normal position.

A further object is to provide means which will at all times hold the axles in a position approximately at right angles whether the jolts are transmitted to the axles or whether the jolts are transmitted to one or both of the wheels.

A still further object is in the construction of the means for holding the axles in such a manner that a direct connection is provided between the frame and axle, and the endwise movable connection, as shown in the patents above referred to, is not required.

With these objects in view, this invention consists of certain novel features of construction and combinations of parts which will be hereinafter more fully described and pointed out in the claims.

In the accompanying drawings:

Figure 1 is a top plan view of a vehicle showing my improvement applied to both the front and rear axles;

Fig. 2 is a view in side elevation of the structure disclosed in Fig. 1;

Fig. 3 is an enlarged view in side elevation with parts broken away to better illustrate the inner end of the reach and its connection with the frame;

Figs. 4 and 5 are detail perspective views of the parts of the mechanism shown in Fig. 3;

Fig. 6 is a view in side elevation of a modified form;

Fig. 7 is a view in top plan of the form disclosed in Fig. 6;

Fig. 8 shows a side elevation of another modified form;

Fig. 9 is a top plan view of the structure in Fig. 8;

Figure 12:
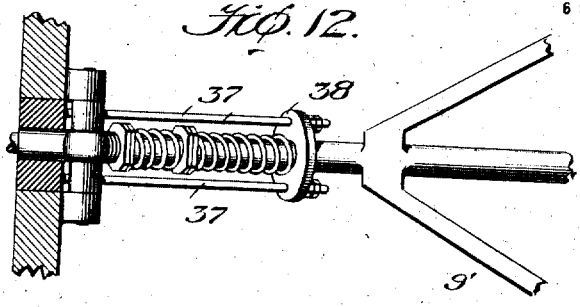

Figs. 10, 11, 12 and 13 disclose still other forms of connection which may be used between the frame and the axle and yet attain the desired result; and Figs. 14, 15, 16 and 17 show forms of my invention in which the axle restoring springs are connected between the axle or load spring and frame.

The usual front and rear axles 1 and 2 are provided and have the wheels 3—3 carried thereby. The frame A is supported by the axles through the load springs 4 and 5 and these load springs 4 and 5 may be of any standard form, the only constructional detail necessary to their successful operation in this connection being that they are pivoted to the frame so that the axle may have movement in the direction of the longitudinal extent of the frame.

It will be seen that the load springs can be of the leaf type, either full elliptical, semi-elliptical, or straight or they can be of the spiral or helical type, and also that the frame can be of the overslung or underslung type.

In the preferred form as shown in Figs. 1 and 2 of the drawings the load springs are shown as of the usual leaf type which may be either full or semi-elliptic and are connected at their ends pivotally with the frame through links 6—6. From the disclosure it will be evident that any other form of spring might be used with equally good results, as for instance a full elliptical spring or a helical spring provided, of course, that spring can be connected to permit the movement of the axle with respect to the frame. In some instances the spring itself might be dispensed with and the link connected direct between the axle and frame.

The frame A has near the center thereof transverse braces 7 and 8 but in every other respect is of standard form and might even be constructed so that the supplemental braces 7 and 8 will form a part of the superstructure and not an additional part. Such form is shown in Fig. 1.

A brace or reach 9 is provided for each of the axles. These braces, as better shown in Fig. 1, are preferably V-shaped in top plan, and at their extremities are secured near the ends of the axle. Each of the cross bars 7 and 8 of the frame A has a bracket 10 depending from the lower side and on the lower end of these brackets a socket 11 of a ball and socket joint is formed. A ball 12 fits into the socket and projects therefrom toward one of the axles. A bearing 13 is formed on the ball member of the joint and at the angle of the V-shaped brace, a similar bearing 14 is provided. A full elliptic spring 15 is rigidly connected to the bearings 13 and 14 by the yokes or clips 16 which are secured by nuts 17. The springs 15 are preferably of the multiple leaf type and these leaves at their ends are shackled to the other leaves of the spring so that the spring would be equally effective both when expanded and compressed, that is the full efficiency of each leaf will be attained in every direction.

With the structure as described, the axles 1 and 2 will be held normally in the position shown in Fig. 2. In traveling over the road, any obstruction which is encountered by the front wheels carried on the axle 1 will cause this axle to move backwardly with respect to the frame, or, as it were, to stand still while the frame moves forward in an uninterrupted line. This momentary halting of the axle is permitted by the spring 15 which is connected to the forward reach 9 and with the cross bar 8 of the frame. By halting the axle, the load spring 4, which is connected between the frame and the axle 1, has sufficient time to flex upwardly and permit the wheel to rise and ride over the obstruction; then when the obstruction or irregularity has been passed, the spring 15 again returns the axle 1 to its normal position. The operation with the rear axle is identical with the exception that a pull instead of a thrust is exerted at the ball and socket connection with the frame and the spring 15 is expanded rather than compressed.

The structure as described will, under ordinary conditions, hold the axle at all times in a position approximately at right angles to the longitudinal extent of the frame, or, as it were, to the line of draft, but if a very severe shock is transmitted to the wheel on one end of the axle, and no shock is transmitted to the wheel on the opposite end, the tendency will be for the angle of the brace carrying the bearing 14 to twist out of its alinement with the connection to the frame, thus straining the spring 15 and causing the axle to be thrown out of its right angular relation to the frame. To overcome this it is preferable that some means of bracing the reach 9, adjacent the bearing 14, be provided, and perhaps a preferable form of bracing means is that shown in Figs. 1 to 5 in which a toggle 18 is made of sufficient width to extend between the side bars of the frame and it is pivoted at its upper end to be suspended below the frame. A bifurcated portion 19 is provided on the toggle to loosely fit over and embrace the sides of the reach 9 at a point 20 adjacent the inner end.

That part of the toggle adjacent the bifurcated portion has slots 21 formed therethrough at right angles to the bifurcation and to communicate with it, and a pin 22 is secured in the portion 20 of the reach 9 to be received in the slots 21. By forming the bracing structure in this manner the reach 9 is free to move backwardly and forwardly against the tension of the spring because of the pivotal connection of the toggle with the frame, and the angular movement or the radial movement of the reach around its connection with the frame due to the flexing of the load springs is taken care of by the slots 21 in which the pin 22 travels.

It will of course be understood that under normal operating conditions, that is with the wheels traveling over a smooth road, the reach will move backwardly and forwardly against the tension of the spring and any great twisting force will not be exerted upon the reach; therefore the portion 20 of the reach will swing freely in the bifurcation of the toggle, but immediately one wheel hits an obstruction which does not transmit a shock to the other wheel, the reach will bear against the side of the bifurcated portion of the toggle and will be held against movement from its alinement with the ball and socket connection of the frame; thus the axle will be held at all times in this position which is approximately at right angles to the longitudinal extent of the frame.

With the structure shown in Figs. 6 and 7, the reach 9 is connected by the spring 15 and the ball and socket joint at a permanent or fixed point to the frame and the axle is free to move because of the resilient connection by the spring. At a point preferably vertically above the connection of the reach with the frame, guide bars 23—23 are connected to the frame so that the guideway 24 formed between them is in a line parallel with the sides of the frame. A bracket 25 is rigidly secured to the reach 9 to project upwardly from a point adjacent the bearing 14 formed at the angle of the reach. This bracket extends into the guideway 24 and a friction roll 26 is journaled thereon to overcome the friction due to the engagement with the guide bars 23. The guide bars 23 have their working faces of sufficient width vertically that as the friction roll 26 is oscillated vertically due to the angular movement of the axle caused by the flexing of the load spring, this roll will always be in a position to engage with the guide bar. It will, of course, be understood that the friction roll will be of less diameter than the transverse dimension of the guideway and that under normal operating conditions the roll will not engage with the guide bars, but when a twisting strain is exerted to the reach, it will engage with one or the other and hold the reach in its proper position, thus preserving the right angular alinement of the axle.

In Figs. 8 and 9 a form very similar in its results to that disclosed in Figs. 6 and 7 is shown. In this structure a cross bar 27 is secured between the side bars of the frame A. The reach 9, spring 15, and ball and socket joint connection are the same.

Bracing brackets 28 are secured to the under side of the cross bar 27 and project downwardly on either side of the forward end of the reach 9. On each side of the reach, on that portion embraced by the bracing brackets 28, slide bearings are provided and these bearings are of sufficient length that as the reach moves backward and forward against the tension of the spring 15, the brace brackets 28 may engage the bearing at any time.

As with the forms already described, it is preferable that there should not be contact normally between the bracing brackets and the bearing on the reach 9 but only when a twisting strain is exerted to the brace through the axle.

In Figs. 10, 11, 12, and 13 several forms of connection between the reach and the fixed point on frame are shown with which additional bracing means, connected to hold the forward end of the reach will not be necessary. In Fig. 10 the body portion of the reach 9' is made tubular. Cylindrical portion 30, of a diameter to fit the opening in the reach, is connected with the ball of the ball and socket joint 31, by which the fixed point is established on the cross bar of the frame. With this structure, an elliptic spring 32 is connected between the ball and the end of the reach to resiliently oppose the telescopic movement of the reach upon the cylindrical bar. In Fig. 11, the reach is constructed in much the same manner as in Fig. 10, but has a tubular extension 33. A nut or collar 34 is screwed on the end of this extension, and coil springs 35 and 36 are received around the extension 33 and the cylindrical bar 30 respectively. In this way the telescopic movement of the reach is resiliently opposed in either direction.

Fig. 12 discloses a structure which is similar to that shown in Fig. 11, the difference being that a skeleton work, composed of the rods 37 and the disk 38, takes the place of the tubular casing as shown in Fig. 11.

Figure 13:
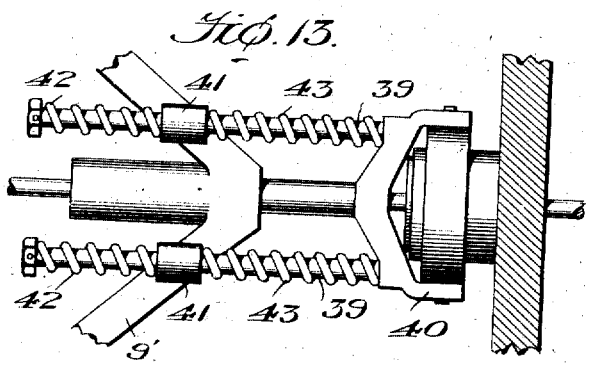

In Fig. 13, rods 39—39 are secured to the hinged bar 40, of the universal joint, bearings 41, carried by the reach 9', have the rods 39 slidably received therethrough, and shock and rebound springs 42 and 43 are received around the rods 39 on either side of the bearings 41 to resiliently oppose movement in either direction.

The structure disclosed in Figs. 14 to 17 differs slightly from the prior disclosure in that in each instance the reach 9ᴬ, the central bar of which is tubular, has telescopic connection with a cylindrical bar 44, which is connected to the movable section of the ball and socket joint 45, which establishes the fixed connection with the frame. In this structure the spring, or means to resiliently oppose movement of the axle longitudinally of the frame, is connected directly between the axle and the frame, or between the load spring and the frame.

Figure 14:
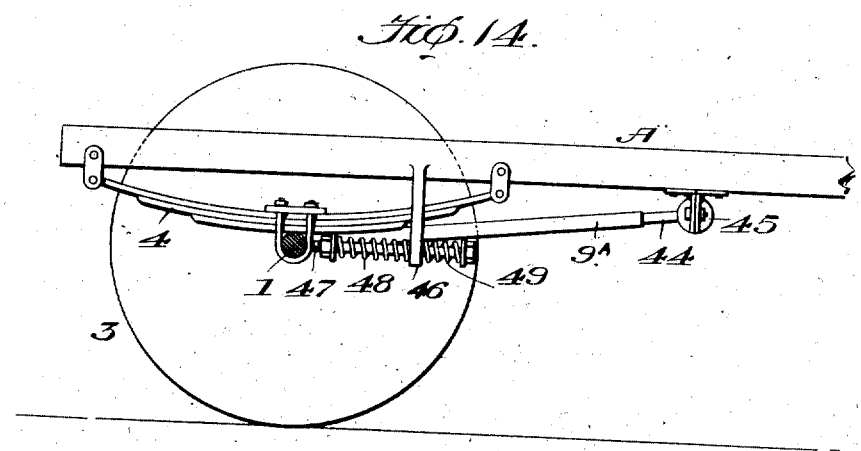

In Fig. 14 a bracket 46 depends from the frame. A rod 47, attached to the axle, has sliding movement through this bracket, and the shock and rebound springs 48 and 49 are received around the rod on either side of the bracket. In Fig. 15, the load spring is shown as of the full elliptical type, and its point of connection with the frame is pivoted at 50, so that the axle can swing longitudinally with respect to the frame. A rectilinear leaf spring is rigidly secured by clips 52 to the load spring at or near its pivotal connection with the frame, and the free end of the spring 51 is secured by a link 53 to the frame. In this way the pivotal connection of the load spring with the frame permits of the longitudinal movement of the axle. The axle is held at right angles by the reach or brace and the rectilinear spring opposing the pivotal movement of the load spring resiliently opposes the movement of the axle longitudinally of the frame.

In Fig. 16 the links 6' are so connected between the frame and load spring that they are at all times under compression. A bracket 54 extends from the frame, and a rod 55 is pivotally connected with one of the links 6' and slidably received through the bracket 54. The shock and rebound springs 56 and 57 are received around the rod 55 on either side of the bracket, and thus resiliently oppose the pivotal movement of the link, and consequently the longitudinal movement of the axle.

Fig. 17 discloses a combination of the structure shown in Figs. 15 and 16. In this instance the rectilinear spring 58 is connected to one of the links, 6ᴬ, by which the load spring is connected with the frame. The spring 58 is rigidly connected to the link beyond the point of pivotal connection with the frame, and thus resiliently opposes the pivotal movement of the link, and consequently the longitudinal movement of the axle.

It will thus be seen that I have provided a structure in which a reach connected with the axle and connected at a fixed point to the frame normally holds the axle in position at right angles to the line of draft and also that any great twisting strain transmitted to the axles by the irregularities of the road is taken care of by the toggle or brace connection.

It is evident that still other modifications might be resorted to without departing from the spirit and scope of my invention, and hence I do not wish to limit myself to the exact construction described herein, but—

Having fully described my invention, what I claim as new and desire to secure by Letters Patent, is:—

1. The combination with a vehicle frame, and a vertically and horizontally movable axle, of a universally jointed fixed point connection with the frame, and means interposed between and connected with the fixed point connection and axle for maintaining the axle square with the line of draft.

2. The combination with a vehicle frame and a movable axle, of means for resiliently opposing the movement of the axle, a fixed point pivot connected to the frame, and means between the fixed point pivot and axle for keeping the latter square.

3. The combination with a vehicle frame and axle, of a V-shaped reach secured to the axle near the extremities thereof, an alinement spring secured to the free end of the reach, a flexible connection between the spring and frame, and a brace pivoted to swing longitudinally of the frame and embracing said free end of the reach for holding it against lateral movement, said reach and brace acting to maintain the axle in a position approximately at right angles to the line of draft and said spring acting to resiliently oppose movement of the axle both backward and forward longitudinally of the frame.

4. The combination with a vehicle frame, and a vertically and horizontally movable axle, of means for resiliently opposing the movement of the axle, a universal pivot connection mounted on the frame at a fixed point, and means between the fixed point pivot connection and the axle for keeping the latter square with the line of draft.

5. The combination with a vehicle frame, axle, and a reach connected to the axle at one end and to the frame at the other end of a universal pivot mounted on the frame, and means in the reach for permitting a variation in the distance between its two ends.

6. The combination with a vehicle frame, axle, and reach connected to the axle at one end and universally mounted on the frame at the other end, of means for permitting a variation of the distance between the two ends of the reach, and means to resiliently oppose such variation.

7. The combination with a frame, axle, and a reach connected with the axle and at a fixed point on the frame, thereby keeping the axle square, of a spring connected with the reach at a point between the fixed point and the axle for resiliently opposing movement of the axle longitudinally of the frame.

In testimony whereof I affix my signature in the presence of two witnesses.

ROLLAND S. TROTT.

Witnesses:
EDWARD LUPFER AURAND,
CHAS. E. STRAWN.